(12) United States Patent
DeFranks et al.

(10) Patent No.: US 9,145,479 B2
(45) Date of Patent: Sep. 29, 2015

(54) ODORLESS FOAM MATTRESS ASSEMBLY

(75) Inventors: Michael S. DeFranks, Decatur, GA (US); Ronald M. Herrington, Brazoria, TX (US)

(73) Assignee: DREAMWELL, LTD., Las Vegas, NV (US)

( * ) Notice: Subject to any disclaimer, the term of this patent is extended or adjusted under 35 U.S.C. 154(b) by 446 days.

(21) Appl. No.: 13/096,760

(22) Filed: Apr. 28, 2011

(65) Prior Publication Data

US 2011/0265270 A1  Nov. 3, 2011

Related U.S. Application Data

(60) Provisional application No. 61/328,885, filed on Apr. 28, 2010.

(51) Int. Cl.
| | |
|---|---|
| *C08J 9/14* | (2006.01) |
| *A47C 27/15* | (2006.01) |
| *A47C 27/00* | (2006.01) |
| *B01D 53/02* | (2006.01) |
| *B01D 53/54* | (2006.01) |
| *C08G 18/32* | (2006.01) |
| *C08G 101/00* | (2006.01) |

(52) U.S. Cl.
CPC . *C08J 9/14* (2013.01); *A47C 27/00* (2013.01); *A47C 27/15* (2013.01); *B01D 53/02* (2013.01); *B01D 53/54* (2013.01); *C08G 18/3218* (2013.01); *B01D 2251/90* (2013.01); *B01D 2252/20* (2013.01); *B01D 2253/202* (2013.01); *B01D 2257/40* (2013.01); *B01D 2257/90* (2013.01); *C08G 2101/0008* (2013.01); *C08G 2101/0083* (2013.01); *C08J 2375/08* (2013.01)

(58) Field of Classification Search
CPC .... A47C 27/00; A47C 27/15; C08G 18/3218; C08G 2101/0008; C08G 2101/0083; C08J 2375/08; C08J 9/14
USPC .......................... 521/130, 163, 170, 174, 175
See application file for complete search history.

(56) References Cited

U.S. PATENT DOCUMENTS

| | | | | |
|---|---|---|---|---|
| 4,056,403 A | * | 11/1977 | Cramer et al. | 134/22.19 |
| 4,401,770 A | | 8/1983 | Hance | |
| 5,523,330 A | * | 6/1996 | Farkas | 521/49 |
| 5,562,883 A | * | 10/1996 | Salisbury et al. | 422/133 |
| 6,245,697 B1 | | 6/2001 | Conrad et al. | |
| 6,495,611 B1 | * | 12/2002 | Arlt et al. | 521/99 |
| 6,706,775 B2 | | 3/2004 | Hermann et al. | |
| 6,759,448 B2 | * | 7/2004 | Toyota et al. | 521/174 |
| 7,624,465 B2 | | 12/2009 | Oh | |
| 7,700,661 B2 | | 4/2010 | Griggs | |
| 7,737,192 B2 | * | 6/2010 | Yano | 521/120 |
| 7,917,980 B2 | * | 4/2011 | Kluft | 5/717 |
| 2003/0130366 A1 | * | 7/2003 | Arlt et al. | 521/99 |
| 2004/0082676 A1 | * | 4/2004 | Douglas et al. | 521/155 |
| 2006/0270747 A1 | | 11/2006 | Griggs | |
| 2009/0005467 A1 | | 1/2009 | Kageoka et al. | |
| 2010/0005610 A1 | * | 1/2010 | Baus et al. | 15/300.1 |
| 2010/0076104 A1 | * | 3/2010 | Wibaux et al. | 521/175 |
| 2010/0168260 A1 | * | 7/2010 | Frenzel et al. | 521/55 |
| 2010/0175193 A1 | | 7/2010 | Oh et al. | |
| 2011/0252572 A1 | * | 10/2011 | Morrison | 5/740 |

FOREIGN PATENT DOCUMENTS

| | | | |
|---|---|---|---|
| DE | 19928689 A1 | | 12/2000 |
| EP | 0458464 A2 | | 11/1991 |
| JP | 07-53658 | * | 2/1995 |
| WO | 2008112712 A1 | | 9/2008 |

OTHER PUBLICATIONS

English Abstract for DE 19928689(A1); 1 page; http://worldwide.espacenet.com/publicationDetails/biblio? DB=EPODOC&II-0&adjacent . . . dated Aug. 30, 2011.
International Search Report for Application PCT/US2011/034376; filed Apr. 28, 2011; 4 pages.
Written Opinion for Application No. PCT/US2011/034376; International Filing Date: Apr. 28, 2011; mailed Aug. 12, 2011; 6 pages.
Notification Concerning Transmittal of International Preliminary Report on Patentability (Chapter 1 of the Patent Cooperation Treaty), issued in International Application No. PCT/US2011/034376, dated Nov. 8, 2012; 7 pages.

* cited by examiner

*Primary Examiner* — John Cooney
(74) *Attorney, Agent, or Firm* — Cantor Colburn LLP

(57) ABSTRACT

The systems and methods described herein relate to providing mattresses with foam that is odor-free. Unpleasant odors can be reduced in foam members by including a source of cyclodextrin during the manufacture of foam. Instead of masking odors with fragrances, the systems and methods described herein reduce odors with the aid of, among other things, a cyclodextrin-water solution. In one aspect, a method of manufacturing an odor-free foam for use in a mattress is provided. The method includes solubilizing cyclodextrin in water to form a cyclodextrin solution, and adding the cyclodextrin solution to a reacting mixture of a polyol and a isocyanate to form an odor-free or reduced-odor foam.

5 Claims, 5 Drawing Sheets

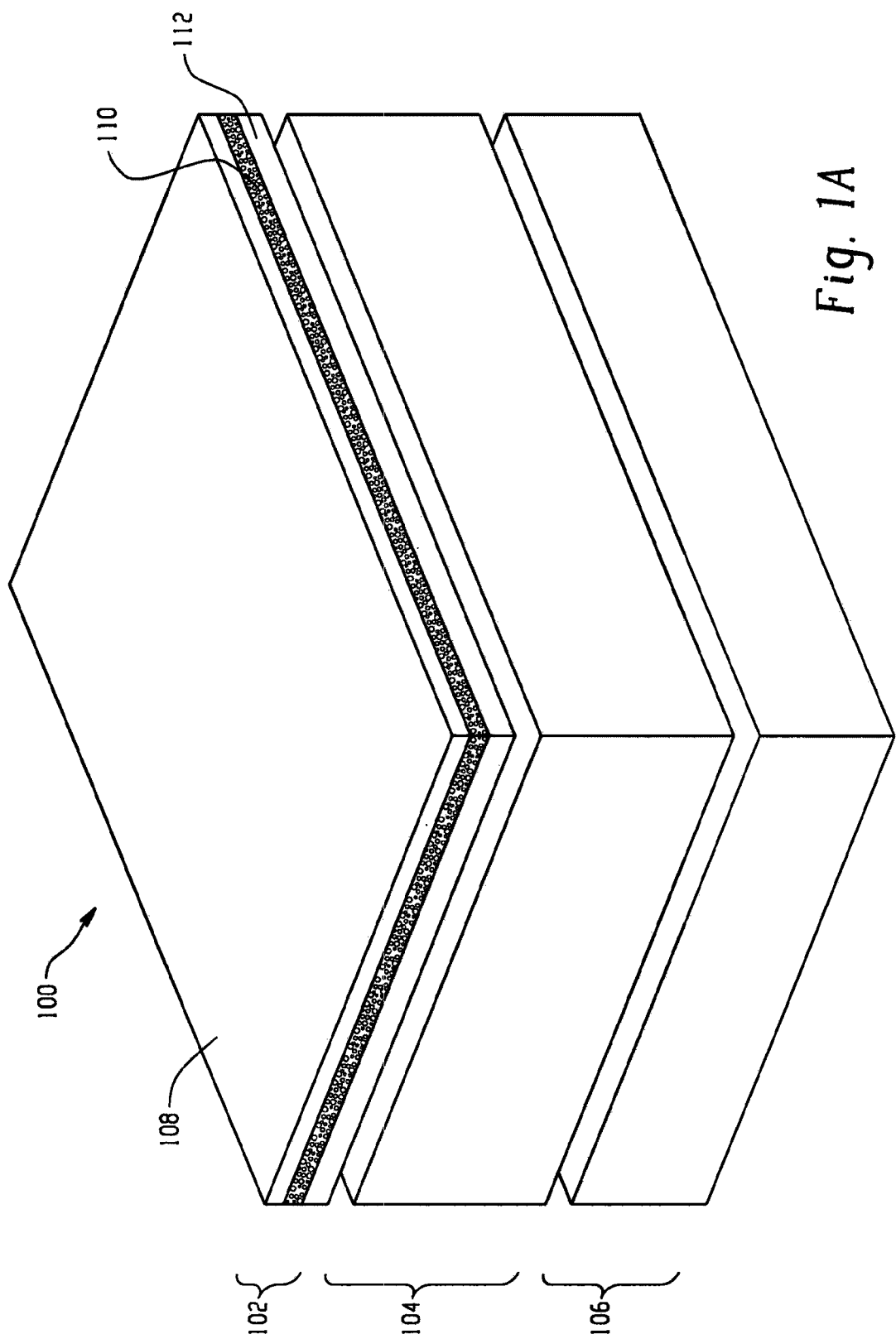

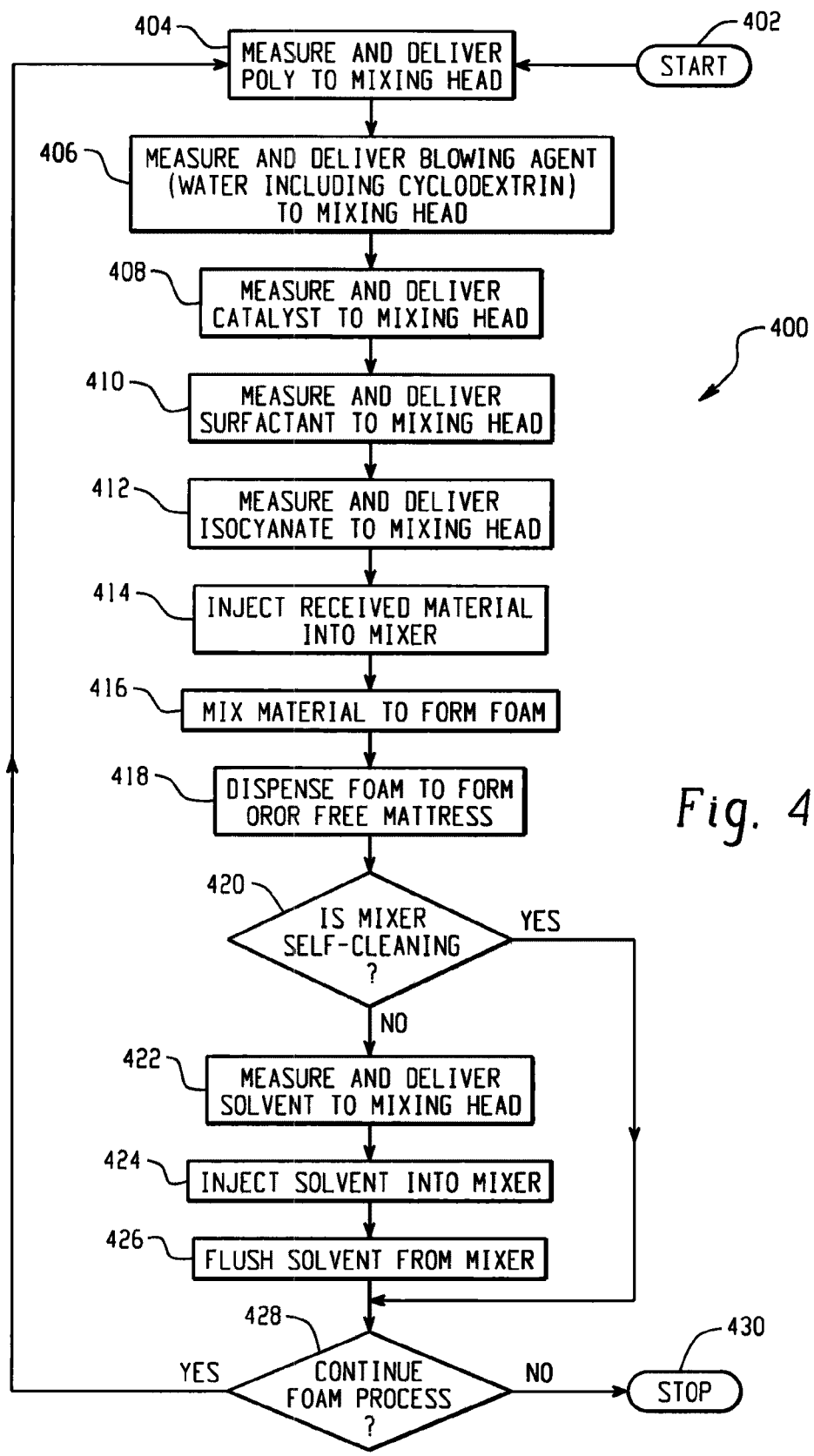

ODORLESS FOAM MATTRESS ASSEMBLY

CROSS-REFERENCE TO RELATED APPLICATIONS

This application claims priority to and the benefit of U.S. Provisional Patent Application Ser. No. 61/328,885, filed Apr. 28, 2010 and entitled "Odorless Foam Mattress Assembly", the entire contents of which are incorporated herein by reference.

FIELD OF THE DISCLOSURE

The systems and methods described herein generally relate to cushioning articles such as pillows and/or mattresses and methods for removing or preventing any odors resulting from foam formation in such articles. More particularly, the systems and methods described herein include foam members formed by mixing odor-reducing compounds with other foam reactants during manufacture to substantially remove odors.

BACKGROUND

Today, furniture, and particularly bedding, manufacturers have developed sophisticated and reliable techniques for manufacturing high quality and durable mattresses. The industry is capable of providing mattresses that last for over ten years providing comfortable sleeping surfaces for all that time. Many of these mattresses include foam, such as polyurethane foams, either as a component of the mattress or as the principal sleeping surface in foam mattresses.

As the industry strives to continue providing improved quality and reliability, one area that needs to be addressed are problems with odors related to foams. During the manufacture of foam, odors are sometimes produced. These odors are thought to be byproducts of the reaction used to make the foam or as a result of a partially incomplete reaction. For example, unreacted or decomposed amines generated during the manufacture of foam for mattress components (such as innercores, cushioning layers and side walls) remain in the final mattress product. These amines generate unpleasant odors that linger for extended periods of time. As a result mattress manufacturers suffer from numerous consumer returns and complaints.

Mattress manufacturers have addressed this problem by requiring the foam buns and components to cure for a certain period of time, such as 72 hours, and checking the foams for odors after this time period has passed. Then, if these foam products do not have odors, they may be used in mattresses. However, waiting a certain period of time before using foams in products results in production delays. Moreover, these manufacturers have to overcome storage issues arising out of the inexact science of determining whether there is an odor in a foam product. These issues are further amplified by the fact that environmental conditions, particularly in winter when the air is cold and dry, may cause the odors to linger for longer periods of time.

Other manufacturers address this problem by adding fragrances to mattresses to mask the unpleasant odors emanating from foam layers. This approach is disadvantageous not only because of the added cost, but also because the pleasantness or unpleasantness of a particular fragrance is highly subjective and may vary across a population, and over time, fragrances can begin to decrease in intensity and reduce the promised benefits of a fragrant mattress.

Accordingly, there is a need in the art to provide for a foam that is free from odor such that it is ready for use in a mattress soon after the foam is cured.

SUMMARY

It is a realization of the systems and methods described herein that improved manufacturing techniques can provide improved mattresses with foam that is odor-free. In particular, unpleasant odors can be reduced in foam members by including a source of cyclodextrin during the manufacture of foam. Instead of masking odors with fragrances, the systems and methods described herein reduce odors with the aid of, among other things, a cyclodextrin-water solution.

The cyclodextrin-water solution may be incorporated into polyurethane foam during manufacture. Polyurethane foam is typically made by introducing tiny expandable gas bubbles into a reacting mixture of a polyol, an isocyanate, and other needed ingredients. As the reactions proceed, a polymer matrix is formed and the bubbles expand to give a cellular structure commonly called a foam. In certain embodiments, flexible polyurethane foams are made with the aid of at least one catalyst. The catalysts may include, among others, organometallics and amines. Various combination of catalysts may be used to establish an optimum balance between the chain propagation reaction (isocyanate with hydrogen) and the blowing reaction (isocyanate with water). In certain embodiments, the polymer formation rate and the gas formation rate may have to balanced so that the gas is entrapped efficiently in the gelling polymer and the cell-walls develop sufficient strength to maintain their structure without collapse or shrinkage. Generally, catalysts may be important for assuring completeness of reaction or cure in the finished form. In certain embodiments, a combination of various amines are used to balance gelling and blowing reactions. In particular, tertiary amines may be used alone or in combination with other catalysts. In certain embodiments, the type and concentration of amine catalysts can be selected to satisfy foam process requirements such as cream times, rise profiles, gel times, and even cure of the outer surface skin. However, amines may impart a residual odor to the foam.

The systems and methods described herein overcome various limitations of current methods by generating reduced-odor or odor-free foam for use in mattresses and cushioning articles. In particular, the systems and methods described herein include foam members formed by mixing in cyclodextrin during manufacture to substantially remove odors due to, e.g., unreacted and/or decomposed amines. Cyclodextrins (sometimes called cycloamyloses) make up a family of cyclic oligosaccharides, composed of 5 or more α-D-glucopyranoside units linked 1->4, as in amylose (a fragment of starch). Some cyclodextrins may contains 32 1,4-anhydroglucopyranoside units. Some cyclodextrins may even have at least 150-membered cyclic oligosaccharides. Some cyclodextrins contain a number of glucose monomers ranging from six to eight units in a ring, creating a cone shape. Examples of such cyclodextrins include six membered sugar ring molecule (α-cyclodextrin), seven sugar ring molecule (β-cyclodextrin) and eight sugar ring molecule (γ-cyclodextrin). In some embodiments, cyclodextrin are synthesized from starch and include environment-friendly bio-content. In certain embodiments, cyclodextrins are produced from starch by means of enzymatic conversion. In some embodiments, certain cyclodextrin have a "snow cone cup-like" molecular shape. The extra surface area afforded by the "snow cone cup-like" shape of cyclodextrin molecules may allow the molecules to bind with hydrocarbonic compounds within the molecule's shape, thus retaining malodorous molecules (such as unreacted and/or decomposed amines) so that they are no longer detected as a scent, and consequently removing any lingering odors.

In some embodiments, the cyclodextrin molecules may retain malodorous molecules by forming complexes with the malodorous molecules. In some embodiments, the cyclodextrin molecules have multiple H-bonding (hydrogen bonding) sites within their shape that attract and bond with malodorous molecules such that their movement is restricted. The restriction in movement of malodorous molecules may reduce odors. In some embodiments, bonding of malodorous molecules with cyclodextrin to form complexes enhances decomposition of the malodorous molecules, and consequently may reduce odors in this manner.

As noted earlier, when manufacturing foam, water is typically added during to the foaming process in the blowing reaction. More particularly, during the blowing reaction, isocyanate is mixed with a blowing agent such as water. Since cyclodextrin is soluble in water, cyclodextrin may be mixed with water and combined with other reactants during the blowing reaction. In some embodiments, commercially-available water solutions containing cyclodextrin, such as Febreze® or Clenzaire®, manufactured by Proctor & Gamble, Cincinnati, Ohio, may be added to the water blowing agent, or may even replace the water as the blowing agent. In other embodiments, any commercially-available solution containing cyclodextrin may be incorporated into polyurethane foam during manufacture.

BRIEF DESCRIPTION OF THE FIGURES

The foregoing and other objects and advantages of the systems and methods described herein will be appreciated more fully from the following further description thereof, with reference to the accompanying drawings wherein;

FIG. 1A depicts a mattress assembly having one or more substantially odor-free foam components, according to an illustrative embodiment;

FIG. 4 depicts a process flow for manufacturing substantially odor-free foam, according to an illustrative embodiment.

DETAILED DESCRIPTION

The systems and methods described herein include, among other things, systems and methods for making a reduced-odor or odor-free foam. Although the systems and methods described herein are described with reference to use with a mattress or sleeping surface, it will be understood by those of skill in the art that the foam processing techniques and systems described herein may be applied in other applications including other furniture related applications for sofas, chairs, love seats, boat seats, and other suitable applications. Such applications including additions and modifications to the systems and methods described herein will not depart from the scope thereof.

FIG. 1A depicts a mattress assembly 100 having one or more substantially odor-free foam components, according to an illustrative embodiment. Materials used in the foam components may include polyurethane foam manufactured from synthetic or natural raw materials or latex foam material or viscoelastic foam materials. The various mattress components containing foam described with reference to mattress assembly 100, may be formed from foam that is manufactured by combining with a cyclodextrin-water solution with isocyanate, polyol, and other raw materials. In some embodiments, the cyclodextrin-water solution may include a commercially available cyclodextrin-water solution, such as Febreze®. Mattress assembly 100 may include a top panel 102, a mattress 104 and a foundation 106. Mattress 104 includes an innercore that may include foam, springs, such as coil springs or encased coil springs, or a combination of foam and spring. In certain embodiments, the innercore may also include other support structures and materials, such as foam, latex, gel, viscoelastic gel, or a combination of the foregoing, in one or more layers. The innercore may have a firmness that varies across its length and width. Foundation 106 may include a mattress frame or mattress corner guards. The mattress frame may be adjustable, allowing the frame and/or mattress to pivot or bend along one or more pivoting axes.

Figure 1B:
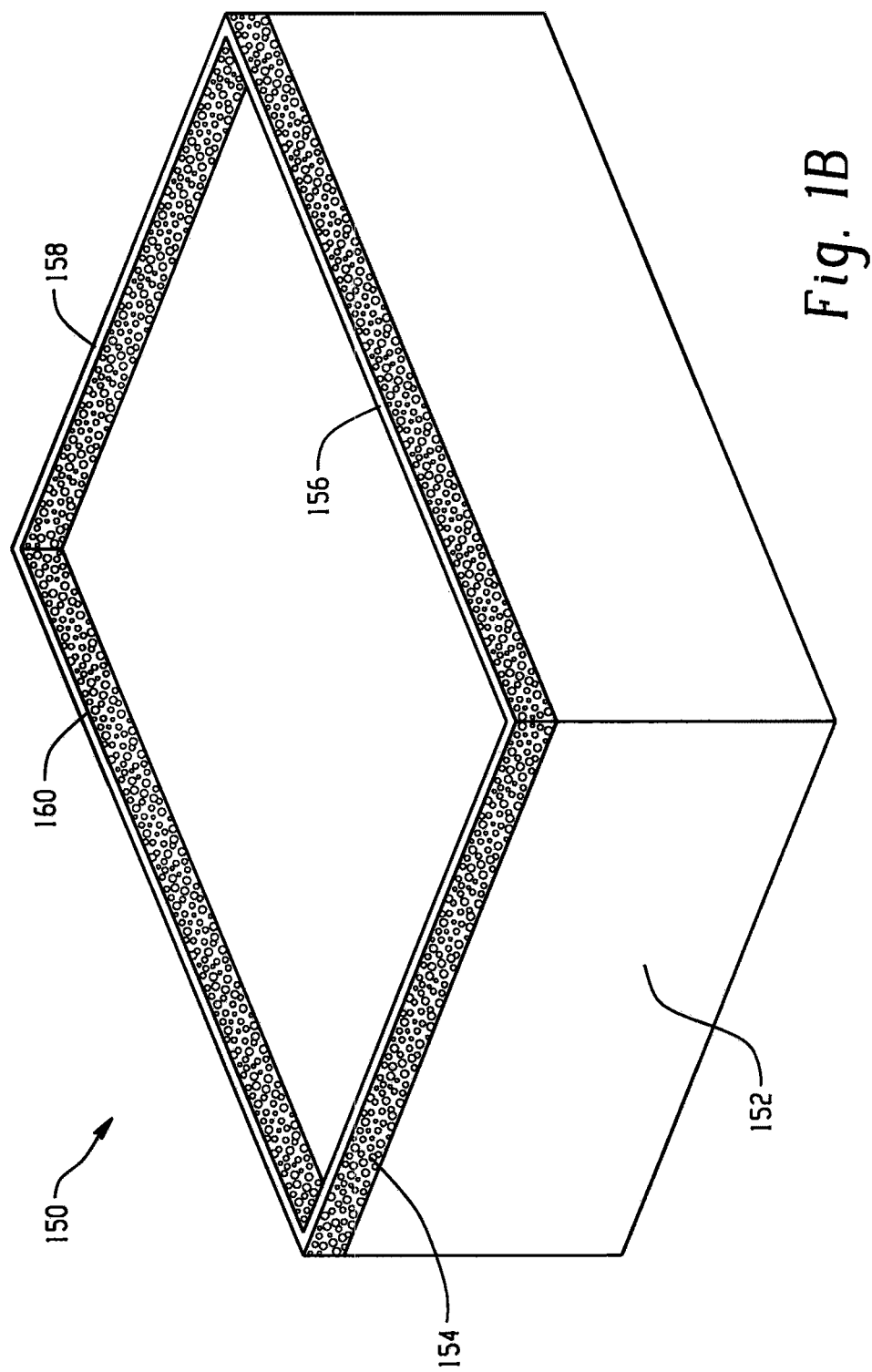
FIG. 1B depicts a mattress assembly having one or more substantially odor-free foam components, according to an illustrative embodiment.

In certain embodiments, mattress 104 may also include one or more side rails. FIG. 1B depicts a mattress assembly 150 having mattress 152 that includes side rails 154,156, 158, and 160. In some embodiments, the side rails may optionally be placed on one side of the innercore, opposing sides of the innercore, on three adjacent sides of the innercore, or on all four sides of the innercore (as shown in FIG. 1B). The side rails may be formed from foam. In some mattress embodiments, the innercore may not include springs, and the side rails may include coil or encased coil springs instead. In some of these embodiments, the springs may be configured to provide foam-like compressive behavior. In some embodiments, the side rails may include edge supports with firmness comparable to or greater than the firmness of the innercore. The side rails may be fastened to the innercore via adhesives, mechanical fasteners, or any other methods for attachment.

In some embodiments, mattress 104 may include a padding layer. The padding layer may be adjacent to the top surface of the innercore or the bottom surface of the innercore. In some embodiments, mattress 104 may be a reversible mattress, in which the top surface and bottom surface in one configuration may be the bottom surface and top surface, respectively, in another configuration. In certain embodiments with side rails, the side rails may also be constructed in a reversible manner. In other embodiments, there may be a padding layer adjacent to the top surface and another padding layer adjacent to the bottom surface of the innercore. The padding layer may include foam, gel, or any other type of padding material, in one or more layers. In some embodiments, mattress 104 may include a topper pad 102 that may define the top exterior surface of the mattress. This topper pad may include foam gel, or any other type of padding material, in one or more layers. For example, topper pad 102 may include a top upholstery layer 108, a foam padding layer 110 and a backing layer 112. In certain embodiments, the topper pad and/or the padding layer may be made of quiltable material. The topper pad may have a uniform height or thickness along its width and length, or its height or thickness may vary along at least one of the width and length. For example, the topper pad may be thicker in the center than at its periphery. In some embodiments, such as for a reversible mattress, a second topper pad may define the bottom exterior surface of the mattress. In certain embodiments, mattress 104 may include an exterior, removable cover. The exterior, removable cover may encapsulate the entire mattress 104 or only a portion of it, such as, for example, the top portion. The exterior, removable cover may fasten to a portion of mattress 104 or to a portion of foundation 102 via mechanical fasteners such as zippers, buttons, hook and clasp fasteners, ties, or any other fastener or fastening method that allows the cover to be removed and replaced. In some embodiments, the removable cover may fasten to itself instead of or in addition to the mattress 104 and/or the foundation 106.

In certain embodiments, mattress 104 may include one or more fire-retardant, liquid-resistant, or allergy-resistant layers. One or more of these layers may be placed adjacent to the innercore on its top surface, bottom surface, and/or one or more side surfaces. In some embodiments, one or more of these layers may be placed adjacent to a surface of a padding layer or a topper pad in the mattress 104. The one or more fire-retardant layers may comprise a fire barrier fabric or laminate that complies with regulatory requirements for flammability, such as the California Bureau of Home Furnishings Technical Bulletin 129 Flammability Test Procedure, the entirety of which is hereby incorporated by reference. In certain embodiments, a fire-retardant layer may be quiltable. The one or more liquid-resistant or allergy-resistant layers may comprise a coated or uncoated fabric or laminate material. The liquid-resistant or allergy-resistant layer may be breathable and quiltable. The various layers detailed above may be fastened to each other in a number of ways. For example, layers may be attached to each other along the edges, in the center, between the edges and the center, or some combination of the above. Attachment may be done via stitching, quilting, adhesives, or fastening via mechanical fasteners.

Figure 2:
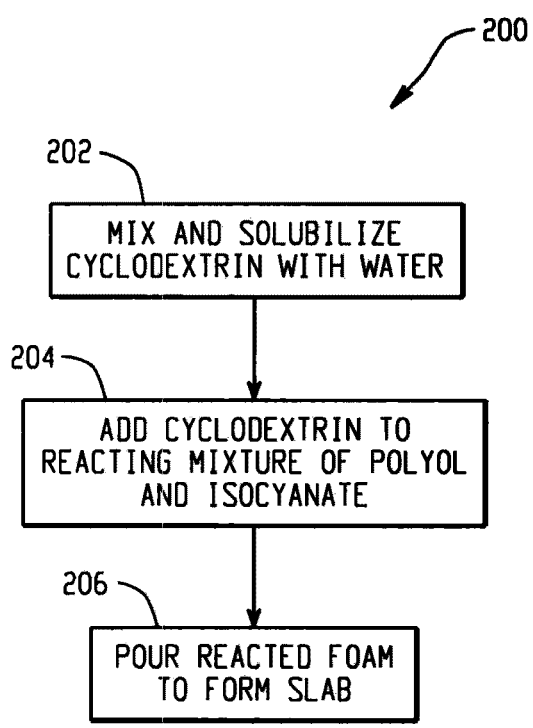
FIG. 2 is a flowchart of a process for manufacturing substantially odor-free foam according to an illustrative embodiment.

FIG. 2 depicts an illustrative process 200 for forming substantially odor-free foam. At step 202, a cyclodextrin-water solution is provided. In some embodiments, the solution may have 1% cyclodextrin by weight. In some embodiments, the solution may have from about 0.5% to about 10% cyclodextrin by weight. In some embodiments, the solvent in the solution may be one of water, liquid carbon-dioxide ($CO_2$), xylene, kerosene, or any other suitable non-odor-inducing solvent. In certain embodiments, cyclodextrin is soluble in water and a cyclodextrin-water solution is provided by solubilizing (or dissolving) cyclodextrin in water. In some embodiments, a cyclodextrin-water solution may be obtained from an external source. For example, a commercially-available cyclodextrin-water solution may be provided, such as Febreze®. At step 204, the cyclodextrin-water solution is added as a blowing agent to a reacting mixture of polyol and isocyanate. The isocyanate reacts with the polyol, in the presence of the blowing agent, and optionally, a catalyst and other raw materials, to form the substantially odor-free foam.

The reaction may be carried out in steps where certain by-products may be generated, some of which, such as by-products from an amine catalyst, may be sources of odor in the foam. However, the cyclodextrin-water blowing agent may reduce or eliminate the odor to provide the desired odor-free foam. In some embodiments, the resulting foam may continue to reduce odors after manufacture, e.g., during use as a mattress. The cyclodextrin molecules may continue to reduce odor by forming complexes with malodorous molecules, and may even renew their odor reducing properties by enhancing decomposition of the malodorous molecules. At step 206, the foam is poured into, e.g., a mould, to form a slab of the odor-free foam. Further details elaborating on process 200 are provided with reference to FIG. 4 below.

Figure 3:
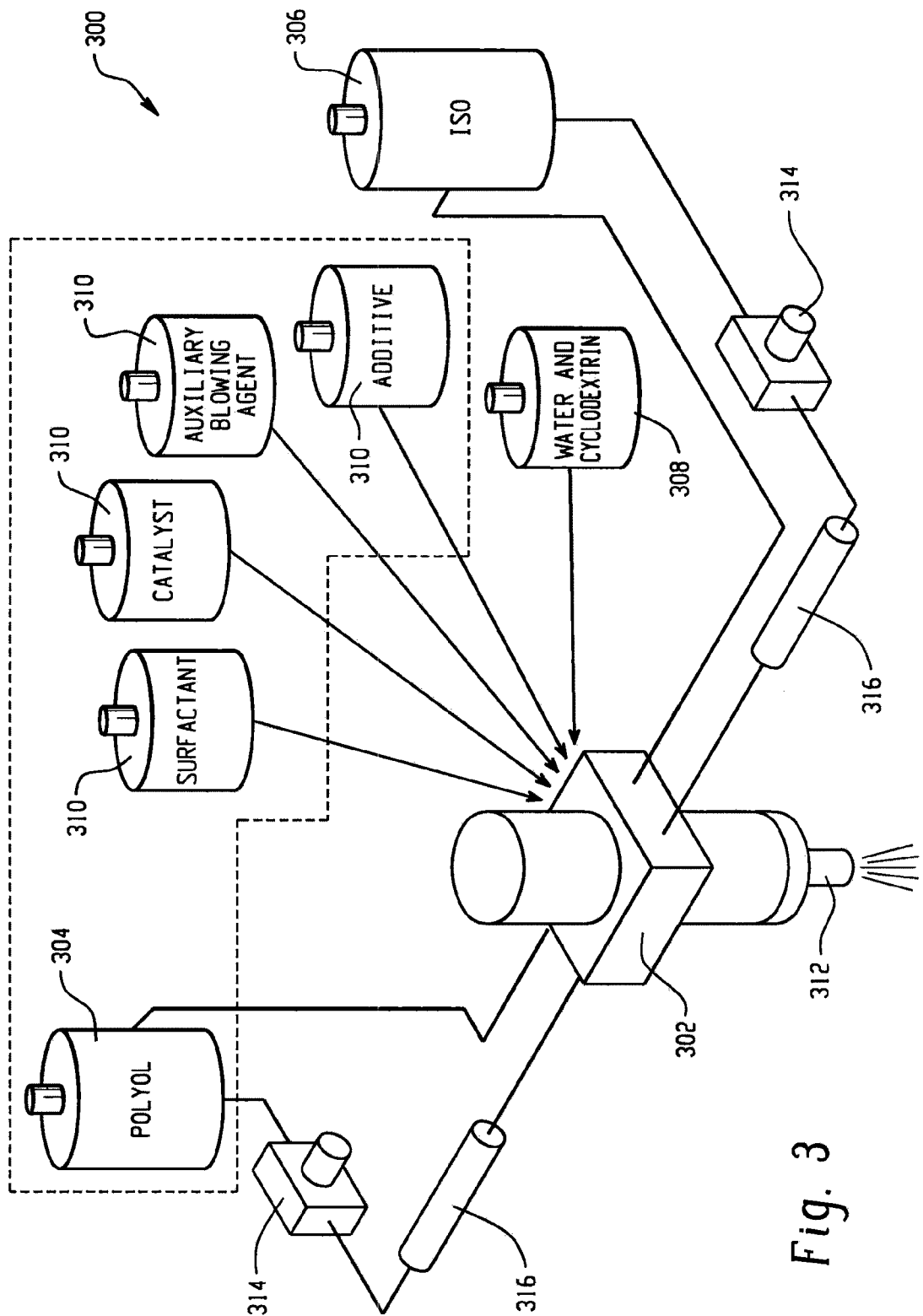
FIG. 3 is a block diagram depicting a system for manufacture of foam with cyclodextrin, according to an illustrative embodiment.

FIG. 3 depicts a block diagram depicting a system for manufacture of foam with cyclodextrin. Polyurethane foam may be formed by introducing tiny expandable gas bubbles into a reacting mixture of a polyol, an isocyanate, a cyclodextrin-water solution as a blowing agent, and other optional raw materials. As the reaction proceeds, a polymer matrix is formed and the bubbles expand to give a cellular structure commonly called a foam. As shown in FIG. 3, the cyclodextrin may be stored as a solution in water in a container 308 and combined with the polyol and isocyanate at mixing head 302. The cyclodextrin-water solution may be added to water used for the foam manufacturing process. In some embodiments, the cyclodextrin-water solution may replace the water used in the foam manufacturing process. In some embodiments, a cyclodextrin-water solution may be added in addition to the blowing agent used, e.g., water. In some embodiments, the cyclodextrin may be stored in a dry state and measured and delivered to mixing head 302 as a powder. The powder may be white in color and may contribute a white color to the foam, i.e., make the foam whiter. In some embodiments, the cyclodextrin may be stored in a mixture with calcium carbonate, and delivered to mixing head 302 as this mixture. The foam mixture may be dispensed via nozzle 312 to form a foam slab, which may subsequently be cured. In some embodiments, cyclodextrin may be introduced to mixing head 302 in a manner similar to the introduction of a filler.

In some embodiments, foams such as polyurethane foams are made using a one-shot process. In this process, the raw materials are either metered separately to a mixing head (e.g., mixing head 302 in FIG. 3) or are metered as two or more preblended batches. For example, a polyol-and-compatible-additives batch and an isocyanate batch, or a polyol batch and an isocyanate-and-compatible-additives batch, may be delivered to the mixing head. As shown in FIG. 3, polyol 304, isocyanate 306, blowing agent 308 (e.g., cyclodextrin-water solution), and additional materials 310, such as a catalyst (e.g., a tin or an amine catalyst), a surfactant (e.g., a silicone surfactant), an additive (e.g., a fire-retardant additive), and an auxiliary blowing agent, are measured and delivered from their respective storage tanks via pipes to mixing head 302.

TABLE 1

Materials and concentration ranges for production of odor-free foam, according to an illustrative embodiment

| Component | Parts by Weight |
|---|---|
| Polyol | 100 |
| Blowing Agent (incl. cyclodextrin) | 1.5-7.5 |
| Surfactant | 0.5-2.5 |
| Catalyst | 0.0-1.5 |
| Filler | 0-150 |
| Additive | Variable |
| Auxiliary Blowing Agent | 0-15 |
| Isocyanate | 25-85 |

Table 1 provides an exemplary list of raw materials and their concentration ranges used during manufacture of foam, according to an illustrative embodiment. The ranges shown in Table 1 are considered to be non-limiting, and may vary below and above the ranges shown. Additional or substitute raw materials other than those listed in Table 1 may be used in manufacture of the foam. The list of raw materials and their composition may be selected to tailor the foam for a given application. In some embodiments, addition of cyclodextrin as a raw material during manufacture of foam may result in changes in expected tensile tear and elongation of the resulting foam. For example, addition of cyclodextrin may increase firmness of the foam, provide a finer foam structure, and/or provide a smoother feel to the foam, in addition to reducing odors. However, addition of excessive cyclodextrin may lead to hardening of the resulting foam and/or make the foam brittle. In embodiments where large amounts of cyclodextrin (e.g., greater than about 10%) are to be added as a raw material, the other raw materials such as the polyol and the isocyanate may be varied to provide a softer than desired foam. The excess cyclodextrin may compensate by increasing hardness and provide a foam with the desired firmness. A mattress having foam manufactured with such large amounts of cyclodextrin may exhibit odor reducing properties for a much longer time when compared with a mattress having foam manufactured with smaller amounts of cyclodextrin.

Pumps such as pumps 314 may be used to measure and deliver the raw material from a storage tank to the mixing head. Pumps 314 may be one of an electrical gear pump, an electrical piston pump, and a hydraulic cylinder pump. The mixing head may be of one recirculating and non-recirculating types. Recirculating mix heads have the raw materials circulated from their respective storage to the mixing head and back to their respective storages. On the other hand, non-recirculating mixing heads have the raw materials delivered, injected, mixed, and dispensed for controlled times without returning any of the raw materials to their respective storage. The raw materials may be varied to provide different types of foam. For example, the cyclodextrin-water solution as a blowing agent may be used in the manufacture of odor-free foam.

Heat exchangers such as heat exchangers 316 may be used to provide appropriate temperatures for the raw materials. The raw material may be recirculated through the heat exchanger until the desired temperature is attained. The process flow for manufacturing odor-free foam using the arrangement of FIG. 3 is provided with reference to FIG. 4 below.

FIG. 4 depicts a process flow for manufacturing odor-free foam, according to an illustrative embodiment. At step 404, a polyol is measured and delivered to the mixing head (e.g., mixing head 302 in FIG. 3). As shown in Table 1, the polyol may be 100 parts by weight of the foam raw materials. The polyol may include polyether type polyols such as polyoxypropylene diols, polyoxypropylene triols, and/or any other suitable polyol. One or more polyols may be mixed together to form foams having different firmness and/or density. At step 406, a blowing agent, e.g., water or a cyclodextrin-water solution, is measured and delivered to the mixing head. In some embodiments, a cyclodextrin-water solution may be added to the blowing agent used, e.g., water. In some embodiments, step 406 may be performed any time between the delivery of the polyol and the delivery of the isocyanate.

In some embodiments, a cyclodextrin-liquid $CO_2$ solution may be added to the blowing agent. In some embodiments, a cyclodextrin-liquid $CO_2$ solution may be used as the blowing agent. Liquid $CO_2$ may be maintained in liquid form during early stages of the foaming process. During mixing of raw materials, the liquid $CO_2$ may rapidly leave the liquid phase and get trapped in the mixture of raw materials, and may consequently expand the resulting foam. In some embodiments, the polyol and other raw materials may be mixed with liquid $CO_2$ by passing the polyol and other raw materials through a module having liquid $CO_2$ before delivering the material to the mixing head (e.g., mixing head 302 in FIG. 3). An example of such a process is described in, among other places, page 5.27 of *Flexible Polyurethane Foams, Dow Chemical Company*, $2^{nd}$ Ed. (1991), the teachings of which book are herein incorporated by reference in their entirety.

At steps 408 and 410, raw materials such as a catalyst and a surfactant are measured and delivered to the mixing head. The catalyst may be important for assuring completeness of the reaction in the finished foam. The catalyst may be an amine catalyst, an organometallic catalyst, or any other suitable catalyst. The surfactant may be added to lower surface tension, stabilize rise, and/or counteract defoaming of the resulting foam. The surfactant may be a silicone-based surfactant or any other suitable surfactant.

In some embodiments, additional raw materials such as a filler, an additive, and/or an auxiliary blowing agent may be measured and delivered to the mixing head. The filler may be added to increase density, load bearing, and/or sound attenuation of the resulting foam. The filler may be barium sulphate, calcium carbonate, or any other suitable filler. The additives may be added for coloring, flame retardancy, bacterial resistance, anti-static properties, and any other suitable additive that imparts desired properties to the foam. In some embodiments, a cyclodextrin-water solution may be added as an additive to impart reduced odor properties to the foam. In such embodiments, the cyclodextrin-water solution may be added in addition to the blowing agent used, e.g., water.

The auxiliary blowing agent may be added to the foam formulation to aid in attaining densities and softness not obtainable with the currently used blowing agent. In some embodiments, the auxiliary blowing agent absorbs heat from the exothermic reaction between polyols and isocyanates, and vaporizes additional gas useful in expanding the foam to a lower density. The auxiliary blowing agent may be fluorocarbon 11, methylene chloride, acetone, liquid carbon dioxide, dialkyl dicarbonates, or any other suitable auxiliary blowing agent that imparts the desired foam density and/or softness.

At step 412, an isocyanate is measured and delivered to the mixing head. The isocyanate may include toluene diisocyanate, diphenylmethane diisocyanate, and/or any other suitable isocyanate. As shown in Table 1, the isocyanate may be 25-85 parts by weight of the foam raw materials. The isocyanate reacts with the polyol, in the presence of the catalyst and other raw materials, to form the odor-free foam. The reaction may be carried out in steps where certain by-products may be generated, some of which, such as by-products from an amine catalyst, may be sources of odor in the foam. However, the cyclodextrin-water blowing agent may eliminate the odor to provide the desired odor-free foam. In some embodiments, the resulting foam may continue to reduce odors after manufacture, e.g., during use as a mattress. In some embodiments, the foam after continued use may show reduced efficacy in odor reduction due to saturation of the cyclodextrin with malodorous molecules.

At step 414, the mixing head injects the received raw materials into a mixer. The mixer may be included in the mixing head (e.g., mixing head 302 in FIG. 3) or the mixer may be a separate component that receives material from the mixing head. The mixing head delivers the material to the mixer in any desired order for forming the odor-free foam. In some embodiments, the polyol and compatible materials, e.g., the blowing agent, may be injected first, and then followed by the isocyanate to initiate the foam-forming reaction. In some embodiments, the isocyanate and compatible materials, e.g., a filler, may be injected into the mixer first, and then followed by the polyol. At step 416, the mixer acts on the received raw material to form the foam. As described above, the isocyanate reacts with the polyol, in the presence of the catalyst and other raw materials, to form the odor-free foam.

In some embodiments, the received raw materials may be combined into a mixture as they are received at the mixing head. In such embodiments, the order of delivery of each raw material to the mixing head may be tailored as desired. For example, the polyol may be delivered first, then the blowing agent, and then the isocyanate. In another example, the isocyanate may be delivered first, then the blowing agent, and then the polyol. In yet another example, the polyol may be delivered first, then the isocyanate, and then the blowing agent.

At step 418, the mixer dispenses the foam mixture (e.g., via nozzle 312 in FIG. 3). In some embodiments, the dispensed foam mixture may continue to react as it is dispensed. The dispensed foam mixture may be collected into a mould to impart, e.g., desired shape properties. For example, the foam may be collected in a rectangular trough to form a foam mattress. The subsequently formed foam slab may then be cured in a ventilated area. In some embodiments, the foam is cured enough after 5-10 minutes to be cut and handled. In some embodiments, a post-cure time of 24 hours may be required for the foam to reach its expected softness. In some embodiments, cyclodextrin may be poured on the resulting foam after its manufacture, in order to create an odor-free or reduced odor foam. However, adding cyclodextrin or a cyclodextrin solution/mixture as an ingredient during manufacture may advantageously provide an even distribution of cyclodextrin throughout the resulting foam, and consequently providing better odor reduction as compared to pouring cyclodextrin on the foam after its manufacture.

If the mixer is self-cleaning, at step 428, the process may be repeated by initiating step 404. Alternatively, if further foam production is not desired, the process may be halted. If the mixer is not self-cleaning, at step 422, a solvent is measured and dispensed to the mixing head. The solvent may be, e.g., methylene chloride, or any other suitable solvent that purge the mixer of residual material. The solvent may be used in between or after repeated foaming operations, to clean the mixer and purge it of residual material that might otherwise accumulate inside the mixer and interfere, chemically or physically, with subsequent foaming operations. At step 424, the solvent is injected into the mixer, and at step 426, the solvent is flushed from the mixer along with any residual material that may have accumulated in the mixer. Additionally, the solvent may also be used to flush the mixing head of any accumulated residual material. Finally, at step 428, the process may be repeated by initiating step 404. Alternatively, if further foam production is not desired, the process may be halted.

Those skilled in the art will know or be able to ascertain using no more than routine experimentation, many equivalents to the embodiments and practices described herein. For example, the illustrative embodiments discuss foam for use in mattresses, but other cushions and furniture may be made with the systems and methods described herein. Accordingly, it will be understood that the systems and methods described are not to be limited to the embodiments disclosed herein, but is to be understood from the following claims, which are to be interpreted as broadly as allowed under the law.

Variations, modifications, and other implementations of what is described may be employed without departing from the spirit and scope of the disclosure. More specifically, any of the method, system and device features described above or incorporated by reference may be combined with any other suitable method, system or device features disclosed herein or incorporated by reference, and is within the scope of the contemplated systems and methods described. The systems and methods may be embodied in other specific forms without departing from the spirit or essential characteristics thereof. The foregoing embodiments are therefore to be considered in all respects illustrative, rather than limiting of the systems and methods described. The teachings of all references cited herein are hereby incorporated by reference in their entirety.

The invention claimed is:

1. A method of manufacturing a cushioning article, comprising
   assembling at least one layer of a substantially odor-free foam with one or more additional layers, wherein the at least one layer of the substantially odor-free foam and the one or more additional layers are fastened to one another to form the cushioning article, wherein the at least one layer of the substantially odor-free foam is a latex foam containing a cyclodextrin.

2. The method of claim 1, wherein the at least one layer of the substantially odor-free foam defines an innercore of the mattress.

3. The method of claim 1, wherein the at least one layer of the substantially odor-free foam defines a topper pad of the mattress.

4. The method of claim 3, wherein the topper pad comprises a top upholstery layer, the substantially odor-free foam, and a backing layer.

5. The method of claim 1, wherein the layers are fastened along edges, at a center, or combination thereof.

* * * * *